United States Patent [19]

Nielinger et al.

[11] Patent Number: 5,416,161

[45] Date of Patent: May 16, 1995

[54] PRODUCTION OF BLEND SYSTEMS BY THE CONDENSATION OF OLIGOCARBONATES IN THE PRESENCE OF MASS-POLYMERIZED ABS

[75] Inventors: Werner Nielinger; Hermann Kauth, both of Krefeld; Dieter Wittmann, Cologne; Dieter Freitag; Karsten-Josef Idel, both of Krefeld, all of Germany

[73] Assignee: Bayer Aktiengesellschaft, Leverkusen, Germany

[21] Appl. No.: 165,662

[22] Filed: Dec. 13, 1993

[30] Foreign Application Priority Data

Dec. 22, 1992 [DE] Germany ............ 42 43 525.0

[51] Int. Cl.⁶ .................. C08L 69/00; C08L 51/04
[52] U.S. Cl. ..................... 525/67; 525/146; 525/148
[58] Field of Search ............ 525/67, 146, 148

[56] References Cited

U.S. PATENT DOCUMENTS

| | | |
|---|---|---|
| 3,852,393 | 12/1974 | Furukawa et al. . |
| 4,336,348 | 6/1982 | Margotte ............ 525/146 |
| 4,386,186 | 5/1983 | Maresca et al. ....... 525/68 |
| 4,526,926 | 7/1985 | Weber et al. ......... 525/67 |
| 4,624,986 | 11/1986 | Weber et al. ......... 525/67 |
| 5,104,963 | 4/1992 | Westeppe et al. ..... 528/196 |
| 5,281,669 | 1/1994 | Kambour ............ 525/146 |

FOREIGN PATENT DOCUMENTS

| | | |
|---|---|---|
| 1170141 | 11/1964 | European Pat. Off. . |
| 0270811 | 6/1988 | European Pat. Off. . |
| 0566313 | 10/1993 | European Pat. Off. . |
| 1570617 | 2/1970 | Germany . |
| 4039023 | 6/1991 | Germany . |

*Primary Examiner*—David Buttner
*Attorney, Agent, or Firm*—Connolly and Hutz

[57] ABSTRACT

The present invention relates to a process for producing polymer blends from polycarbonate and mass-polymerized ABS by the condensation of oligocarbonate in the presence of mass-polymerized ABS.

6 Claims, No Drawings

PRODUCTION OF BLEND SYSTEMS BY THE CONDENSATION OF OLIGOCARBONATES IN THE PRESENCE OF MASS-POLYMERIZED ABS

The present invention relates to a process for producing polymer blends from polycarbonate and mass-polymerized ABS by the condensation of oligocarbonate in the presence of mass-polymerized ABS.

The condensation of oligocarbonates to form polycarbonate is already known (see EP-A 432 580).

Thermoplastic blends are usually produced by mixing and homogenizing the components in the melt. However, some thermoplastic blends have hitherto not been accessible by this route, since the difference in processing temperatures is too great, and a joint compounding operation is only possible if it is accepted that one or more of the blend components will undergo degradation. In such a mode of operation, the overall property profile of the resulting blend may be adversely affected by the thermal degradation of one blend component.

Thermoplastic moulding materials comprising polycarbonates and ABS polymers are known. For example, DE 1 170 41 describes the good processability of moulding materials comprising polycarbonates and graft polymers of monomeric mixtures of acrylonitrile and an aromatic vinyl hydrocarbon on polybutadiene (emulsion-polymerized ABS).

According to U.S. Pat. No. 3,852,393, mixtures of polycarbonates and ABS polymers, wherein the latter were produced by the mass suspension process, are suitable for the manufacture of flame-retardant moulding materials.

According to U.S. Pat. No. 4,624,986, moulding materials comprising ABS polymers produced by the mass- or mass suspension process and polycarbonates exhibit improved low-temperature properties and reduced lustre.

Due to their favourable properties, blends comprising polycarbonates and ABS polymers have been widely employed in motor vehicle technology (passenger compartment components) and in data systems technology (housing components).

In general, polycarbonate and ABS are only partially compatible (particularly in the forms which are commercially the most important, viz. bisphenol A polycarbonate and BS polymer), which results in a two-phase system being formed. A high degree of shear or a high mixing temperature for the melt is therefore necessary for complete dispersion of the phases. This can lead to degradation and discoloration of the product.

It is desirable further to improve the toughness of the blend, which is insufficient for some applications, by using polycarbonates of higher molecular weight. The high melt viscosity of such polycarbonates constitutes an obstacle to this.

It has now been found that blends of polycarbonate and ABS polymers with improved properties are obtained by the preparation of a mixture comprising a low molecular weight polycarbonate (oligocarbonate) and an ABS, the latter being produced by a mass- or solution polymerization process, and the condensation of the oligocarbonate under reduced pressure.

Compared with mixtures prepared from oligocarbonates and ABS graft polymers produced by the emulsion- or mass suspension polymerization process, these blends are characterized by improved toughness values and excellent thermal stability.

The present invention therefore relates to a process for producing blends of polycarbonates and ABS graft polymers, the latter being produced by the mass- or solution polymerization process, characterized in that oligocarbonates (A) and ABS graft polymers (B) are mixed in the melt, and in the process the oligocarbonates are condensed under reduced pressure to form high molecular weight polycarbonate.

It is particularly advantageous in relation to this process if mixing and condensation can be carried out in a batch process or, preferably continuously, in a vacuum evaporation extruder, optionally without isolation of the oligocarbonates.

Component A

The preparation of oligocarbonates is known. It is effected by the reaction of diphenols of formula (I) with diaryl carbonates at temperatures of 150° to 350° C. (see EP-A 432 580, for example). Diphenyl carbonate is the preferred diaryl carbonate. The ratio of diphenols to diaryl carbonates is 1:0.95 to 1:1.75.

Catalysts may be added to speed up the reaction. Suitable catalysts comprise basic organic and/or inorganic compounds, e.g. alkali or alkaline earth metal hydroxides, alcoholates, salts or hydrides, or pyridine. Other catalysts which may be employed comprise organophosphorus compounds such as triphenyl phosphine or triphenyl phosphine oxide, or organometallic compounds such as tributyl tin oxide.

Suitable oligocarbonates (A) are synthesized from diphenols corresponding to formula (I):

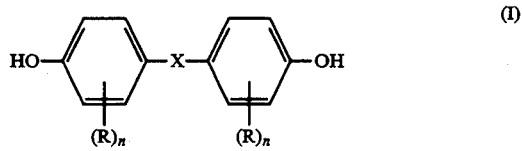

where X is a $C_1$–$C_8$ alkylidene or a $C_5$–$C_{12}$ cycloalkylidene, or —S—, —$SO_2$—, or a single bond,
R is methyl, chlorine or bromine, and
n is zero, 1 or 2.

Preferred diphenols comprise the following, for example:
4,4-dihydroxyphenyl,
4,4'-dihydroxyphenyl sulphide,
1,1-bis-(4-hydroxyphenyl)-cyclohexane,
bis-(4-hydroxyphenyl)-methane,
2,2-bis-(4-hydroxyphenyl)-propane,
2,4-bis-(4-hydroxyphenyl)-2-methylbutane,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl)-sulphone,
2,4-bis-(3,5-dimethyl-4-hydroxyphenyl)-2-methylbutane,
2,2-bis-(3,5-dichloro-4-hydroxyphenyl)-propane,
2,2-bis-(3,5-dibromo-4-hydroxyphenyl)-propane, and
1,1-bis-(4-hydroxyphenyl)-3,3,5-trimethylcyclohexane.

Particularly preferred diphenols from those listed above comprise 2,2-bis-(4-hydroxyphenyl)-propane and 1,1-bis-(4-hydroxyphenyl)3,3,5-trimethylcyclohexane The diphenols may be used both separately and in admixture.

The oligocarbonates preferably have average molecular weights $M_w < 22,000$, particularly molecular weights $M_w$ from 2000 to 20,000.

Component B

The ABS graft polymer (B) is obtained by the graft polymerization of

B.1 50 to 99 parts by weight of a mixture comprising

B.1.1 50 to 99 parts by weight of styrene, α-methyl styrene, styrenes with substituents in the aromatic ring, $C_1$–$C_8$ alkyl methacrylates, or mixtures thereof, and B.1.2 1 to 50 parts by weight of acrylonitrile, methacrylonitrile, $C_1$–$C_8$ alkyl methacrylates, $C_1$–$C_8$ alkyl acrylates, maleic anhydride, N-alkyl or N-aryl substituted maleic imides or mixtures thereof, in the presence of B.2 1 to 50 parts by weight of a rubber which is copolymerizable with B.1.1 and B.1.2 and which has a glass transition temperature $< 10°$ C., wherein the graft polymer (B) is produced by a mass- or solution polymerization process.

The rubber-modified graft polymer (B) comprises a random (co)polymer formed from monomers according to B.1.1 and B.1.2, and a rubber B.2 engrafted with the random (co)polymer from B.1.1 and B.1.2, (B) being produced in the known manner by a mass- or solution polymerization process, as described in U.S. Pat. Nos. 3,243,481, 3,509,237, 3,660,535, 4,221,833, and 4,239,863, for example.

Examples of monomers B.1.1 include styrene, α-methyl styrene, p-methyl styrene, p-chlorostyrene and methyl methacrylate. Examples of monomers B.1.2 include acrylonitrile, methacrylonitrile, methyl methacrylate, n-butyl acrylate, t-butyl acrylate, maleic anhydride, and N-phenyl maleic imide.

Preferred monomers B.1.1 comprise styrene, α-methyl styrene and methyl methacrylate. Preferred monomers B.1.2 comprise acrylonitrile, maleic anhydride and methyl methacrylate.

Particularly preferred monomers are styrene (B.1.1) and acrylonitrile (B.1.2).

Suitable rubbers B.2 for the rubber-modified graft polymers (B) include diene rubbers and EP(D)M rubber, for example, i.e. those based on ethylene/propylene and optionally diene, acrylate, polyurethane, silicone, chloroprene and ethylene/vinyl acetate rubbers.

Preferred rubbers B.2 comprise diene rubbers (e.g. those based on butadiene, isoprene, etc.) or mixtures of diene rubbers or copolymers of diene rubbers or their mixtures with other copolymerizable monomers (e.g. according to B.1.1 and B.1.2), with the proviso that the glass transition temperature of component B.2 is less than 10° C., preferably less than −10° C. Pure polybutadiene rubber is particularly preferred.

If necessary, and if the rubber properties of component B are not impaired thereby, component B.2 may in addition contain small amounts, usually less than 5 weight % and preferably less than 2 weight % based on B.2, of ethylenically unsaturated monomers with a cross-linking effect. Examples of such monomers with a cross-linking effect include alkylenediol di(meth)acrylates, polyester di(meth)acrylates, divinylbenzene, trivinylbenzene, triallyl cyanurate, allyl (meth)acrylate, diallyl maleate and diallyl fumarate.

The rubber-modified graft polymer B. is obtained by graft polymerization of 50 to 99 parts by weight, preferably 65 to 98 parts by weight, most preferably 75 to 97 parts by weight, of a mixture comprising 50 to 99 parts by weight, preferably 60 to 95 parts by weight, of monomers according to B.1.1, and 1 to 50 parts by weight, preferably 5 to 40 parts by weight, of monomers according to B.1.2, in the presence of 1 to 50 parts by weight, preferably 2 to 35 parts by weight, most preferably 3 to 25 parts by weight, of the rubber component B.2, the graft polymerization being carried out using a mass- or solution polymerization process.

It is essential to the production of the rubber-modified graft polymers B. that the rubber component B.2 is present in dissolved form in the mixture of monomers B.1.1 and B.1.2 before the graft polymerization. The rubber component B.2 must therefore not be cross-linked to such a degree that a solution in B.1.1 and B.1.2 becomes impossible, and B.2 must not be present in the form of discrete particles before the start of the graft polymerization. The particle morphology and increasing degree of cross-linking of B.2 which have a significant effect on the properties of B. are first formed in the course of the graft polymerization (in this connection, see Ullmann, Enzyklopädie der technischen Chemie, Volume 19, page 284 et seq., Fourth Edition, 1980, for example).

The random copolymer formed from B.1.1 and B.1.2 is usually present in part in the polymer B. grafted on to or into the rubber B.2, this mixed graft polymer forming discrete particles in the polymer B. In this respect, the proportion of grafted-on or grafted-in copolymer formed from B.1.1 and B.1.2 to the total copolymer formed from B.1.1 and B.1.2—i.e. the graft yield (=the weight ratio of the graft monomers actually grafted to the total amount of graft monomers used $\times 100$, expressed in %)—should be 2 to 40 %, preferably 3 to 30%, most preferably 4 to 20%.

The average particle diameter of the resulting grafted rubber particles (determined by counting on electron microscope photographs) lies in the range from 0.05 to 5 μm, preferably from 0.08 to 3.0 μm.

In the process according to the invention, the blends of polycarbonate and ABS graft polymers (B), the latter having been produced by the mass- or solution polymerization process, are produced from the oligomeric polycarbonates (A) in the presence of the ABS graft polymer as follows:

The oligomers (A) are further condensed at temperatures from 200° to 350° C. in the presence of (B). The condensation may be performed in the usual reactors, such as stirred vessels, thin-film evaporators, stirred vessels in cascade, extruders, kneaders, simple plate reactors or high-viscosity plate reactors. In a preferred embodiment the condensation is performed in a vacuum evaporator at a pressure of 0.01 to 100 mbar, preferably 0.05 to 50 mbar.

The blend component (B) is added in an amount of 0.1 to 99.9 weight %, preferably 10 to 90 weight % most preferably 25 to 75% (based on 100% A+B).

The blends of polycarbonate and ABS graft polymer may contain other thermoplastics, such as SAN copolymers for example, and the usual additives such as stabilizers, pigments, flow promoters, demoulding agents, antistatic agents or flame-retardants.

The blend systems according to the invention may be processed to form mouldings, by shaping them to form various articles in an injection moulding machine for example, optionally after the introduction of additives, in the known manner.

The products produced by the process according to the invention have a good inherent colour and are solvent-free. They are distinguished in particular by their high toughness.

In the examples listed below the relative viscosity was measured on a 0.5 weight % solution of the polycarbonate in methylene chloride.

The molecular weights were determined by gel permeation chromatography (GPC).

EXAMPLES

Preparation of an oligocarbonate from 2,2-bis-(4-hydroxyphenyl)-propane (bisphenol A).

2,2-bis-(4-hydroxyphenyl)-propane (5130 g/22.5 mole), diphenyl carbonate (5056 g/23.63 mole) and sodium phenolate (26.1 m/0.001 mole percent) were heated to 180° C. in a 25 l stirred vessel over 15 minutes. When the temperature of the mass had reached 100° C. a vacuum of 100 mbar was applied with stirring. The temperature was maintained at 180° C. for 1 hour and the phenol liberated was distilled off via a column. The temperature was raised to 250° C. over a further hour, and he pressure was then reduced to 10 mbar over 30 minutes. Further condensation was performed under high vacuum (1 mbar) at 270° C. After flushing with nitrogen the oligocarbonate was removed from the vessel.

The average molecular weight (weight average) was determined using a combined gel permeation chromatography/Fourier transform/IR analysis method, the oligocarbonate or polycarbonate being detected in the wave number range from 1768 to 1775 cm$^{-1}$. The weight average molecular weight of the oligocarbonate as measured by this method was 16,800 g/mole.

EXAMPLE 1 (according to the invention)

60 parts of the oligocarbonate and 40 parts of Magnum 3405 mass-polymerized ABS (manufactured by Dow) were compounded in an evaporation extruder (ZSK 32, manufactured by Werner und Pfleiderer) at a rotational speed of 100 rpm and at a throughput of 4 kg/hour. The temperature of the mass was 295° C. and the pressure at the evaporation head was 0.7 mbar.

The mass-polymerized ABS polymer contained acrylonitrile, butadiene and styrene in a ratio of 22.0:10.2:67.9. The average partial diameter was 0.2 to 2 μm, and the microgel content in acetone was 20.4 weight %.

The (weight average) molecular weight of the polycarbonate obtained was 29,500 g/mole.

EXAMPLE 2 (comparison)

60 parts of the oligocarbonate, 16 parts of a styrene/acrylonitrile copolymer with a styrene/acrylonitrile ratio of 72:28 and a limit viscosity (n)=0.55 dl/g in dimethylformamide at 20° C., and 24 parts of an emulsion-polymerized graft polymer formed from a monomer mixture comprising 45 parts by weight of styrene and acrylonitrile (weight ratio 72:28) on 55 parts by weight of a particulate polybutadiene rubber (average particle size d$_{50}$=0.4 μm, produced by emulsion polymerization [prepared according to DE-OS 3 738 143, analogous to graft polymer B II]) were compounded as described in Example 1.

The temperature of the mass during compounding was 285° C. The average molecular weight of the polycarbonate was 17,500 g/mole.

No significant increase in the molecular weight of the oligocarbonate was therefore obtained using the emulsion-polymerized graft polymer.

EXAMPLE 3 (comparison)

60 parts of polycarbonate with a molecular weight of 24,900 g/mole, and 40 parts of the mixture comprising 24 parts of emulsion graft polymer and 16 parts of styrene/acrylonitrile polymer as used in Example 2 were compounded in a double-shaft extruder, Typ ZSK 32. The temperature of the mass during compounding was 264° C., and the throughput was 5 kg/hour.

The average molecular weight of the polycarbonate fraction was 19,800 g/mole (decomposition of the polycarbonate used).

When the test was repeated with the addition of a heat-stabilizer based on a phosphoric acid ester, the polycarbonate was not decomposed. The temperature of the mass during compounding was 266° C., and the throughput was 5 kg/hour. The average molecular weight of the polycarbonate fraction was 26,000 g/mole.

EXAMPLE 4 (comparison)

60 parts of polycarbonate with a molecular weight of 24,800 g/mole and 40 parts by weight of Dow Magnum 3405 ABS were compounded as in Example 3, with the addition of the heat-stabilizer. The temperature of the mass was 264° C., and the throughput was 5 kg/hour. The molecular weight of the polycarbonate fraction was 24,400 g/mole (slight decomposition).

mixture was distinguished from those of Example 3 by a significantly lighter colour.

The following values were obtained for the notched bar test toughness of the products, measured according to ISO 180 at room temperature:

| | |
|---|---|
| Example 1 (according to the invention) | 74 kJ/m$^2$ |
| Example 2 (comparison) | 35 kJ/m$^2$ |
| Example 3 (comparison) | |
| without stabilizer | 34 kJ/m$^2$ |
| with stabilizer | 48 kJ/m$^2$ |
| Example 4 (comparison) | 51 kJ/m$^2$ |
| Example 1 (according to the invention): | |

EXAMPLE 1 (according to the invention)

oligocarbonate+mass-polymerized ABS: high toughness

EXAMPLE 2 (comparison)

oligocarbonate+emulsion-polymerized ABS: no further condensation of the oligocarbonate, therefore lower toughness

EXAMPLE 3 (comparison)

High molecular weight PC and emulsion-polymerized ABS
  without heat-stabilizer: decomposition of the high molecular weight PC
  with heat-stabilizer: practically no decomposition, but lower toughness than in Example 1 according to the invention

EXAMPLE 4 (comparison)

High molecular weight PC+mass-polymerized ABS: practically no decomposition, but lower toughness, poor colour.

We claim:

1. A process for producing blends of polycarbonates and rubber modified graft polymers, the latter being produced by the mass- or solution polymerization process, characterized in that oligocarbonates (A) and rubber modified graft polymers (B) are mixed in the melt, and in the process the oligocarbonates are condensed under reduced pressure to form high molecular weight polycarbonate.

2. A process according to claim 1, characterized in that the oligocarbonates are synthesized from diphenols corresponding to formula (I)

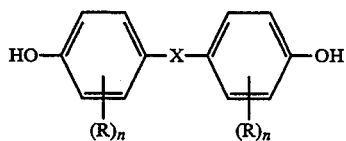

where
X represents a $C_1$-$C_8$ alkylidene or a $C_5$-$C_{12}$ cycloalkylidene, or —S—, —$SO_2$—, or a single bond,
R represents methyl, chlorine or bromine, and
n is 0, 1 or 2,
and have an average molecular weight (weight average) $M_w < 22,000$.

3. A process according to claim 1, wherein the rubber modified graft polymers (B) are obtained by graft polymerization in a mass- or solution polymerization process from
B.1 50 to 99 parts by weight of a mixture comprising
B.1.1 50 to 99 parts by weight of styrene, α-methyl styrene, styrenes with substituents in the aromatic ring, or mixtures thereof, and
B.1.2 1 to 50 parts by weight of acrylonitrile, mathacrylonitrile, $C_1$-$C_8$ alkyl methacrylates, $C_1$-$C_8$ alkyl acrylates, maleic anhydride, N-alkyl or N-aryl substituted maleic imides or mixtures thereof, in the presence of
B.2 1 to 50 parts by weight of a rubber which is copolymerizable with B.1.1 and B.1.2 and which has a glass transition temperature $<10°$ C.

4. A process according to claim 1, characterized in that the rubber modified graft polymer (B) is added in an amount from 0.1 to 99.9 weight % (based on 100 weight % A+B).

5. A process according to claim 1, characterized in that the rubber modified graft polymer (B) is added in an amount from 10 to 90 weight % (based on 100 weight % A+B).

6. A process according to claim 3, characterized in that component B.2 is polybutadiene.

* * * * *